(12) United States Patent
Giles et al.

(10) Patent No.: US 12,170,540 B2
(45) Date of Patent: Dec. 17, 2024

(54) RADIO FREQUENCY OVER OMNI-DIRECTIONAL FREE SPACE OPTICS

(71) Applicant: L3Harris Global Communications, Inc., Melbourne, FL (US)

(72) Inventors: Timothy James Giles, Brockport, NY (US); Andrew J. Eller, Naples, NY (US); Richard Furness, Kent, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 45 days.

(21) Appl. No.: 18/059,466

(22) Filed: Nov. 29, 2022

(65) Prior Publication Data

US 2024/0178914 A1    May 30, 2024

(51) Int. Cl.
*H04B 10/112*    (2013.01)

(52) U.S. Cl.
CPC ................... *H04B 10/112* (2013.01)

(58) Field of Classification Search
CPC .................... H04B 10/112; H04B 10/114
See application file for complete search history.

(56) References Cited

U.S. PATENT DOCUMENTS

| | | |
|---|---|---|
| 8,977,133 B2 | 3/2015 | Schmidt |
| 11,115,119 B1 | 9/2021 | Lee |
| 2014/0052405 A1* | 2/2014 | Wackym .............. A61B 5/6803 702/141 |
| 2015/0244461 A1 | 8/2015 | Kerek |
| 2018/0014094 A1* | 1/2018 | Billet ................. H04Q 11/0005 |
| 2018/0351684 A1 | 12/2018 | Osenbach et al. |
| 2020/0195342 A1* | 6/2020 | Rapaport ............. H04B 10/116 |
| 2021/0340679 A1* | 11/2021 | Glass ..................... G01N 17/02 |
| 2023/0067343 A1* | 3/2023 | Zhang ..................... H01Q 9/30 |

OTHER PUBLICATIONS

Achut et al., "Replacing RF with VLC in Hand Held Mobile Networks—Using Solar Powered Light Communication with Network Planning," IEEE 2016 International Conference on Communication And Electronics Systems (ICCES), 6 pages (2016).
Bohata et al., "The Evaluation of an RoF System Using FSO and a Seamless Antenna Link for the 5G RAN," IEEE 2021 17th International Symposium on Wireless Communication Systems (ISWCS), 5 pages (2021).
Shah et al., "Characterization of RF Signal Transmission using FSO Links Considering Atmospheric Effects," SPIE, 10 pages (2008).

(Continued)

*Primary Examiner* — Shi K Li
(74) *Attorney, Agent, or Firm* — Fox Rothschild LLP; Carol E. Thorstad-Forsyth

(57) ABSTRACT

Systems and methods for reducing detection and interference of signals communicated from a communication device. The methods comprise: coupling an RF-to-FSO converter to a port of the communication device; providing a first radio frequency signal from the communication device to the RF-to-FSO converter via the port; using the first radio frequency signal by the RF-to-FSO converter to modulate an optical signal; and emitting the modulated optical signal from the RF-to-FSO converter through free space.

8 Claims, 13 Drawing Sheets

(56) References Cited

OTHER PUBLICATIONS

Umezawa et al., "Radio Over FSO Communication Using High Optical Alignment Robustness 2D-PDA and its Optical Path Switching Performance," Journal of Lightwave Technology, 39(16), pp. 5270-5277 (2021).

Zubow et al., "Hy-Fi: Aggregation of LiFi and WiFi using MIMO in IEEE 802.11," 2021 IEEE 22nd International Symposium on a World of Wireless, Mobile and Multimedia Networks (WoWMoM), pp. 100-108 (2021).

* cited by examiner

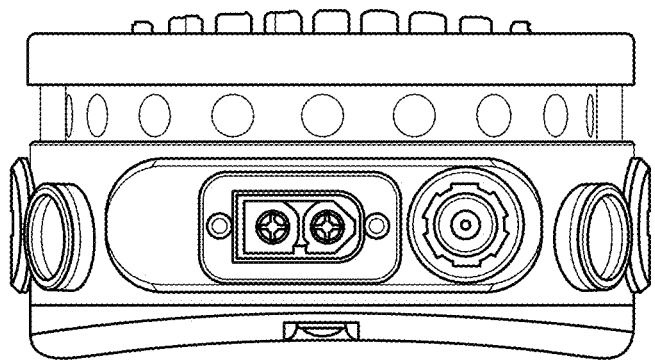
FIG. 15
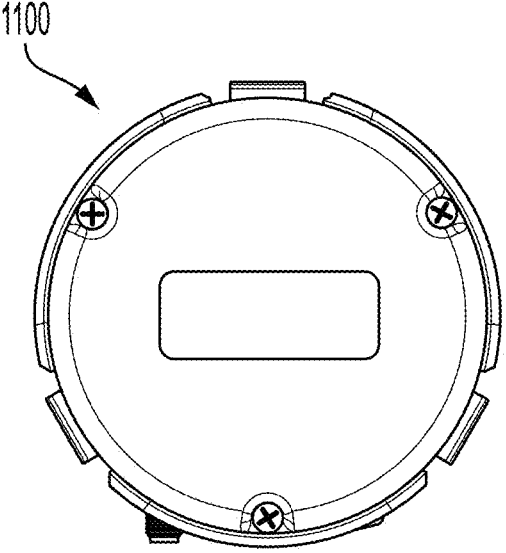 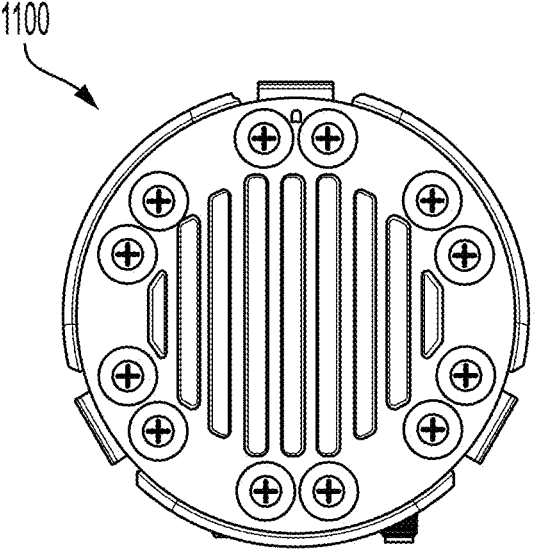
FIG. 16  FIG. 17

RADIO FREQUENCY OVER OMNI-DIRECTIONAL FREE SPACE OPTICS

BACKGROUND

Description of the Related Art

There are various communication networks known in the art. Such communication networks include a tactical network, a Land Mobile Radio (LMR) network, a Wideband Code Division Multiple Access (WCDMA) based network, a Code Division Multiple Access (CDMA) based network, a Wireless Local Area Network (WLAN), and a Long Term Evolution (LTE) based network. Each of these communication networks comprises a plurality of communication devices and network equipment configured to facilitate Radio Frequency (RF) communications between the communication devices through free-space. The distance covered by these communications can be inches, miles or even light years.

These RF communications can be detected, intercepted and/or jammed by undesired recipients. The undesired recipient can use specialized equipment to determine the characteristics of the Radio Frequency (RF) emitters These characteristics include, for example, direction, location and message content. There are many conventional solutions to reduce the probability of an undesired recipient detecting and intercepting the RF communications. However, some of these conventional solutions are no longer effective in view of improvements in the specialized equipment being used by the undesired recipients to detect and intercept signals.

SUMMARY

The present document relates to implementing systems and methods for reducing detection and interference of signals communicated to and from a communication device. The methods comprise: coupling an RF-to-free space optical (FSO) converter to a port of the communication device; providing a first radio frequency signal from the communication device to the RF-to-FSO converter via the port; using the first radio frequency signal by the RF-to-FSO converter to modulate an optical signal; and emitting the modulated optical signal from the RF-to-FSO converter through free space.

BRIEF DESCRIPTION OF THE DRAWINGS

The present solution will be described with reference to the following drawing figures, in which like numerals represent like items throughout the figures.

FIGS. 11-17 provide illustration of another architecture for an RF-to-FSO converter in a helmet mountable form.

DETAILED DESCRIPTION

Figure 1:
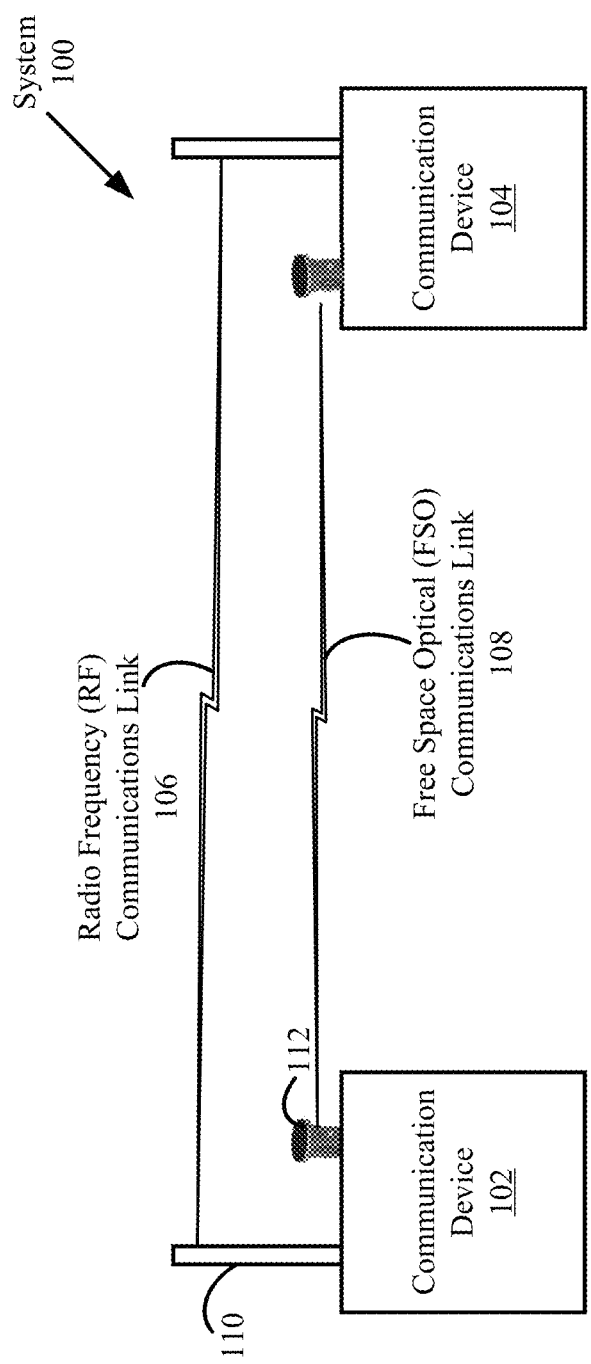
FIG. 1 provides an illustration of an illustrative communication system.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present solution generally concerns implementing systems and methods for reducing detection and interference of signals communicated to and from a communication device. The methods comprise: optionally coupling an RF-to-FSO converter to a helmet coupling (directly or indirectly) an RF-to-FSO converter to a port (e.g., an antenna port) of the communication device; providing a first radio frequency signal from the communication device to the port; detecting by the RF-to-FSO converter when the first RF signal is present at the port; causing a switch to change position or state based on the detection of the first RF signal; adjusting a frequency of the first radio frequency signal; using the first radio frequency signal by the RF-to-Optical converter to modulate an optical signal; emitting the modulated optical signal from the RF-to-FSO converter through free space; and/or comprising causing the switch to change position or state when the first RF signal is no longer being provided to the port of the communication device. In scenarios where the communication device has multiple transceivers, a second radio frequency signal may be transmitted from the communication device using an antenna coupled to another antenna port thereof.

The methods may also involve: receiving an optical signal at the RF-to-FSO converter; converting the optical signal to an electrical signal; adjusting a frequency of the electrical signal; and providing the electrical signal, with the adjusted frequency, from the RF-to-FSO converter to the communication device via the port.

The present solution also concerns an electronic device. The electronic device comprises: a connector; and a circuit coupled to the connector. The circuit is configured to: receive a first radio frequency signal when the connector is coupled to a port (e.g., an antenna port) of an external communication device; use the first radio frequency signal to modulate an optical signal; and emit the modulated optical signal through free space. The connector is directly couplable to the port or indirectly couplable to the port of the communication device via an extender or a cable. The circuit may be further configured to adjust a frequency of the first radio frequency signal prior to when the first radio frequency signal is used to modulate the optical signal.

The circuit may comprise a switch, and also be configured to: detect when the first RF signal is present at the port of the communication device; cause the switch to change position or state when a detection of the first RF signal is made; and/or cause the switch to change position or state when the first RF signal is no longer being provided to the port.

The circuit may further be configured to: receive an optical signal at the RF-to-FSO converter; convert the optical signal to an electrical signal; adjust a frequency of the electrical signal; and provide the electrical signal, with the adjusted frequency, from the RF-to-FSO converter to the communication device via the port. The circuit may comprise a plurality of optical emitters and a plurality of optical detectors arranged to provide, for example, a 360° field of view.

The present solution also concerns a signal converter that is helmet mountable. The signal converter comprises: a main body; a connector coupled to the main body; a circuit disposed in the main body and coupled to the connector; and a coupler disposed on a bottom surface of the main body and configured to removably couple the signal converter to a helmet. The circuit is configured to: receive a first radio frequency signal when the connector is coupled to a port of an external communication device; use the first radio frequency signal to modulate an optical signal; and cause the modulated optical signal to be emitted through free space. The circuit comprises a plurality of optical emitters circumferentially arranged on a top surface of the main body and a plurality of optical detectors supported by sidewalls of the main body in a spaced apart arrangement.

Referring now to FIG. 1, there is provided an illustration of a system 100 implementing the present solution. System 100 comprises two or more communication devices 102, 104 that are configured to wirelessly communicate with each other via an RF communications link 106 and an FSO communications link 108. RF communications are facilitated by antennas 110 connected to first antenna connectors (not visible in FIG. 1) of the communication devices, while optical communications are facilitated via RF-to-FSO converters 112 to second antenna connectors (not visible in FIG. 1) of the communication devices. The particulars of the RF-to-FSO converters 112 will be discussed in detail below.

Each of the communication devices can include, but is not limited to, a portable radio, a phone, a vehicular communication device or other electronic device. An illustration of a portable radio 200 is provided in FIG. 2.

Figure 2:
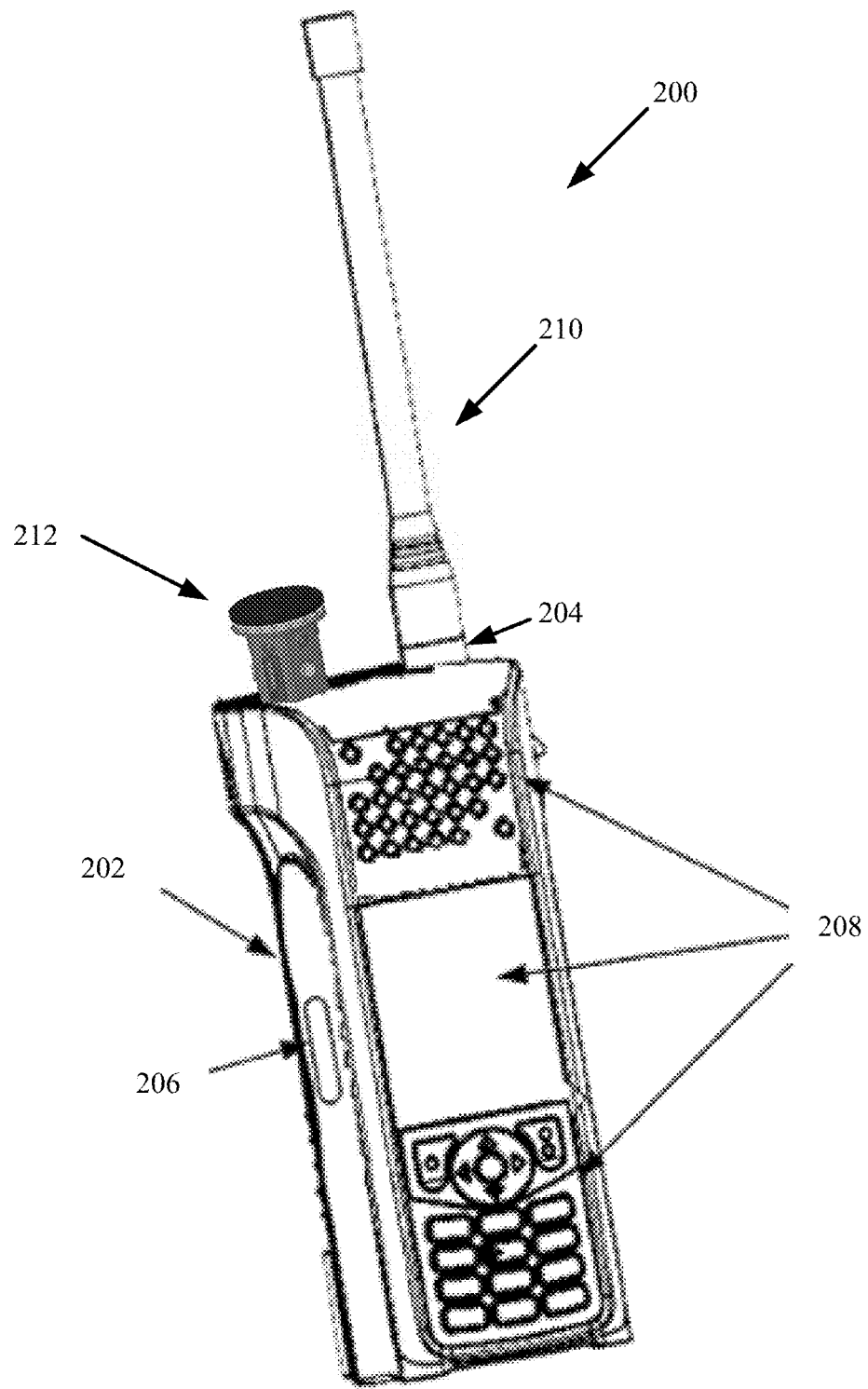
FIG. 2 shows a communication device with an RF-to-FSO converter coupled to an antenna port thereof.

As shown in FIG. 2, the portable radio 200 comprises a housing 202, at least one antenna port 204 and internal circuitry (not shown in FIG. 2). The portable radio 200 also includes control elements 206 and other user interface components 208. The user interface components 208 can include, but are not limited to, a speaker, a display screen, and/or a keypad. The speaker volume and/or radio parameters may be controlled via control elements 206. The controllable radio parameters can include, but are not limited to, a frequency, a mode, and/or a waveform. The portable radio 200 is configured to operate in an RF communication mode and an RF-to-FSO communications mode. In the RF communications mode, the portable radio 200 transmits and receives RF signals via an antenna 210 coupled to a first one of the antenna port(s) 204. In the RF-to-FSO communications mode, the portable radio 200 transmits and receives optical signals via the RF-to-FSO converter 212. The RF-to-FSO converters 112 of FIG. 1 may be the same as or similar to RF-to-FSO converters 212 coupled to a second one of the antenna ports 204. When the portable radio has only one antenna port, then the antenna and RF-to-FSO converter are configured to be coupled to/from the same antenna port such that they can be interchanged with one another.

Figure 3:
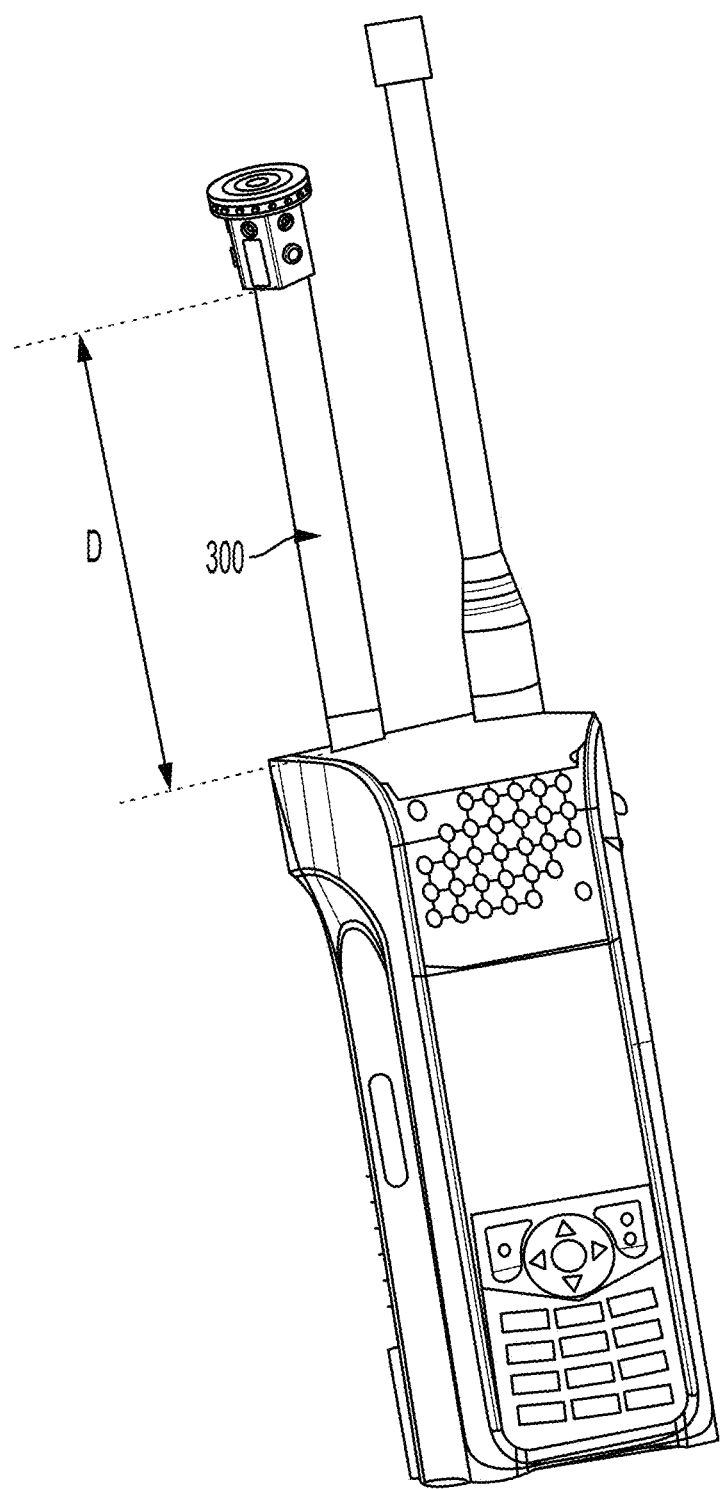
FIG. 3 shows the RF-to-FSO converter coupled to an antenna port via an extender.

The RF-to-FSO converter 212 can be directly coupled to an antenna port as shown in FIG. 2 or alternatively indirectly coupled to the antenna port as shown in FIG. 3. No modifications to the antenna port and/or portable radio are required to facilitate the direct and/or indirect coupling of the RF-to-FSO converter thereto. In FIG. 3, an extender 300 is used to mount the RF-to-FSO converter 212 a certain distance D from the portable radio's housing. The extender 300 can be used to improve the chances of omni-directional optical links without unintended interference from a user's body, equipment and/or movements.

Figure 4:
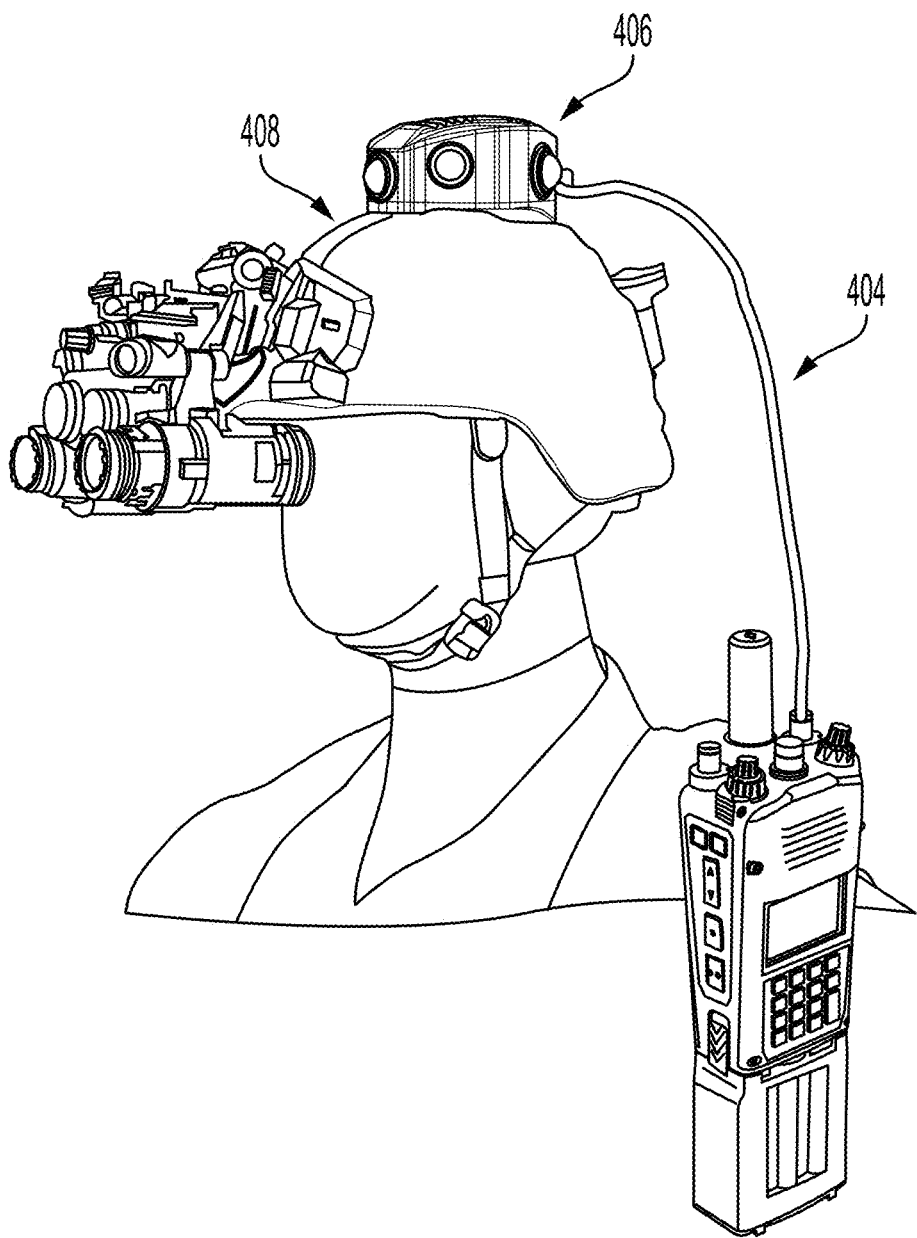
FIG. 4 shows an RF-to-FSO converter coupled to a helmet and a portable communication device via a cable.

The RF-to-FSO converter 212 is shown in FIGS. 1-3 in an antenna port connector form. The present solution is not limited in this regard. The RF-to-FSO converter can alternatively be in a helmet mountable form as shown in FIG. 4. In this case, the RF-to-FSO converter 406 can be mounted or otherwise coupled to a helmet 408 and connected to a portable communication device via a cable 404. The mounting/coupling of the RF-to-FSO converter 406 to the helmet 408 can be achieved using one or more mechanical couplers. The mechanical couplers can include, but are not limited to, Velcro, screws, slots, and/or latches. This helmet mountable configuration also does not require any modifications to the antenna port and/or portable radio to facilitate the indirect coupling of the RF-to-FSO converter 406 thereto. The helmet mountable configuration may be employed to increase the chances that the optical communication link will not be affected by unintended interference from a user's body, equipment or movements.

The present solution is not limited to a helmet mountable configuration. The RF-to-FSO converter could be mounted or otherwise coupled to an object other than a helmet, such as an aerial vehicle with an RF communications relay.

The RF-to-FSO converter 212, 406 is generally configured to recreate RF capabilities in an optical domain, thereby allowing various different types of RF waveforms to operate via omni-directional FSO. The different types of RF waveforms include, but are not limited to, mobile ad hoc network (MANET) waveforms, very high frequency (VHF) waveforms, ultra-high frequency (UHF) waveforms, and/or Line of Sight (LOS) waveforms. The RF-to-FSO converter 212, 406 changes a user's detectable RF signature to infrared emissions, creating a new level of obscurity with the same level of security inherent to the communication devices (e.g., tactical radios). RF is used to modulate an optical emitter of the FSO communications link 108. Conversely, the optical detector demodulates the RF signal from the FSO communications link 108. The RF-to-FSO converter 212, 406 has a relatively small form factor resulting in a simple, easy, inexpensive, unburdensome, omni-directional and low power solution for improved communications with significantly less chance of detection and/or interference.

The RF-to-FSO converter 212, 406 has many novel features. For example, the RF-to-FSO converter 212, 406 converts RF communications to FSO communications, uses a plurality of optical emitters and detectors to provide an N degree field of view (FOV) in one or more planes (e.g., horizontal planes and/or vertical planes) and/or directions (e.g., a frontward facing direction, a backward facing direction, a left side facing direction, a right side facing direction, a skyward direction and/or a groundward direction). N is an integer between zero and three hundred sixty. The FOV could be spherical in some cases. This enables RF waveforms for dismount users without degrading their mobility.

Modulation of an RF carrier onto an optical beam allows for many separated channels of communication as well as interference rejection in congested environments. The portable radio can operate on a number of RF channels. For example, a first channel has an associated frequency of 100.1 MHz, while a second different channel has an associated frequency of 102.0 MHz. Signals can be communicated over the first and second channels without interfering with each other. In the RF-to-FSO communication mode, the RF signals of the first and second channels can be used to modulate a beam of light. The FSO system operates at, for example, a wavelength of 1550 nm. A first user can modulate the 1550 nm beam of light at 100.1 MHZ, while a second user modulates the 1550 nm beam of light at 102 MHz. In effect, a first portion of the relatively wide optical bandwidth (e.g., 100 GHz) is used for communicating to/from the first user's communication device, while a second portion of the relatively wide optical bandwidth is used for communicating to/from the second user's communication device. As a result, the communications associated with the first and second users are optically isolated from each other. Stated differently, the first and second users have separated communication without interference. Users may additionally modulate beams of light with different wavelengths (e.g., 1400 nm and/or 1600 nm).

Figure 5:
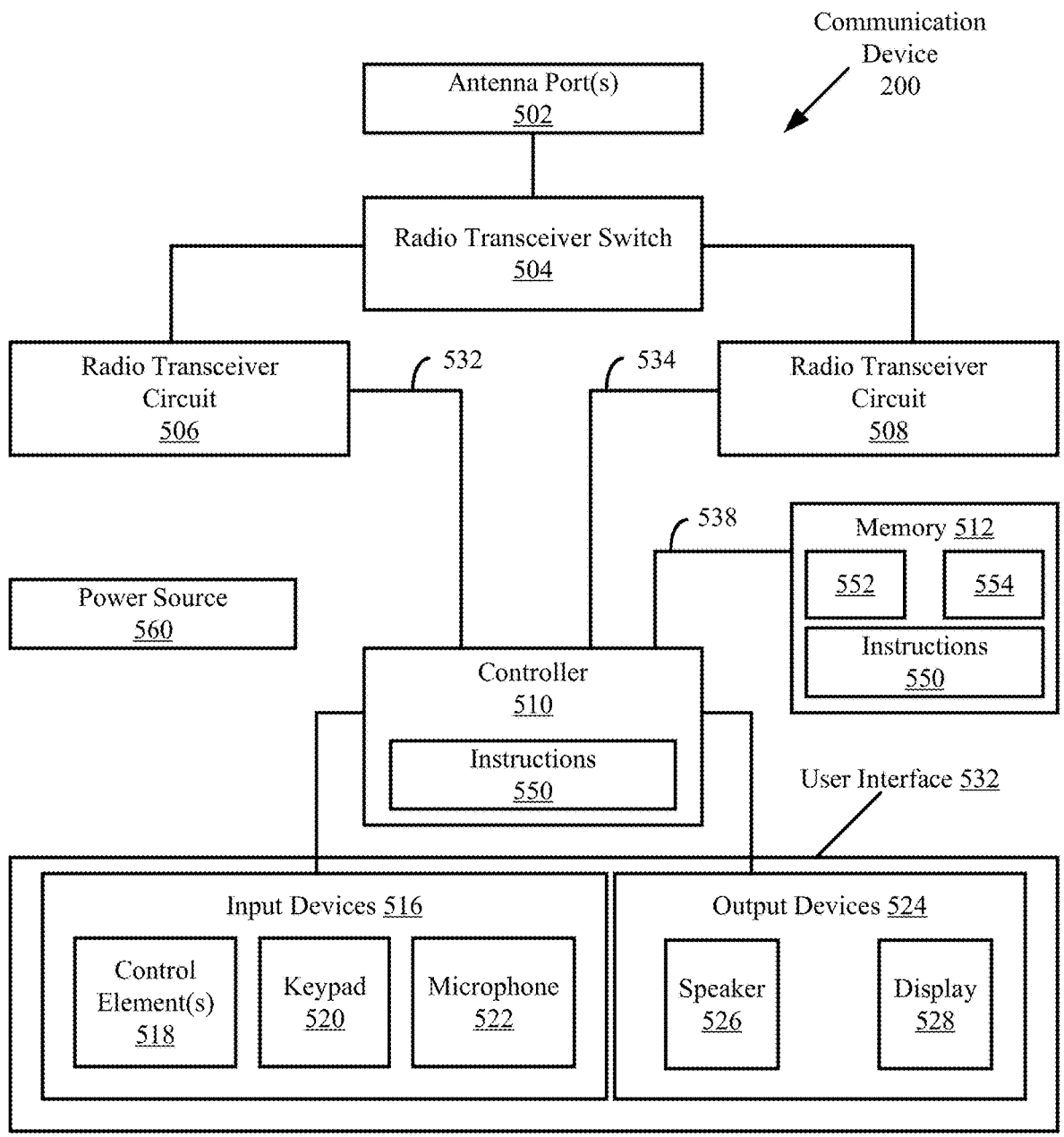
FIG. 5 provides an illustration of hardware architecture for the communication device shown in FIG. 2.

A more detailed block diagram of the portable radio 200 is provided in FIG. 5. The portable radio 200 may include more or less components than those shown in FIG. 5. However, the components shown are sufficient to disclose an illustrative hardware architecture of a communication device. The hardware architecture of FIG. 5 represents one embodiment of a representative communication device configured to facilitate communications over both an RF communications link (e.g., RF communications link 106 of FIG. 1) and an FSO communications link (e.g., FSO communications link 108 of FIG. 1) in accordance with the present solution.

The portable radio 200 may include one radio transceiver (not shown) or two radio transceivers as shown in FIG. 2. A user is able to change the preset function for each radio transceiver. By changing the preset function, one or more operating parameters for a respective radio transceiver is modified. The operating parameters include, but are not limited to, a frequency, a mode, and/or a waveform. The frequency can include, but is not limited to, a satcom frequency, VHF and/or UHF. The mode can include, but is not limited to, a satellite communications mode, an ad-hoc network mode, a cellular network mode, and/or a P25 network mode. The waveform can include, but is not limited to, a MANET waveform, a satellite communications waveform, a VHF waveform, a UHF waveform, and/or an LOS waveform. When the RF-to-FSO converter 212, 406 is used with such a multi-transceiver radio, the radio can communicate RF signals over an RF communications link (e.g., RF communications link 106 of FIG. 1) and communicate optical signals over an FSO communications link (e.g., FSO communications link 108 of FIG. 1). The communications over the RF and optical communications links can be simultaneous. Thus, users can crossband RF communication networks into optical communication networks using a single communication device with an RF-to-FSO converter.

The portable radio 200 also comprises antenna port(s) 502 to which an antenna can be coupled for receiving and transmitting Radio Frequency (RF) signals and/or to which an RF-to-FSO converter 212, 406 can be coupled for receiving and transmitting optical signals. A radio transceiver switch 504 selectively couples the antenna port 502 to a first radio transceiver circuit 506 and a second radio transceiver circuit 508 in a manner familiar to those skilled in the art. The present solution is not limited in this regard. The portable radio 200 can alternatively comprise one or more antenna ports for each radio transceiver, and therefore may be absent of the radio transceiver switch 504 for selectively connecting the radio transceivers to a common antenna port.

Radio transceiver circuits are well known in the art, and therefore will not be described in detail herein. Still, it should be understood that each radio transceiver circuit is configured to (i) cause information to be transmitted to a network via RF signals and (ii) process RF signals received from the network to extract information therefrom. The first and second radio transceiver circuits 506, 508 are coupled to a controller 510 via respective electrical connections 532, 534. In a transmit mode, the controller 510 also provides information to the radio transceiver circuits 506, 508 for encoding and modulating information into RF signals. The radio transceiver circuits 506, 508 communicate the RF signals to the antenna port 502 for transmission to an external device (e.g., network equipment not shown in FIG. 5). In a receive mode, the transceiver circuits provide decoded RF signal information to the controller 510. The controller 510 uses the decoded RF signal information in accordance with the function(s) of the portable radio 200.

The controller 510 stores the decoded RF signal information in a memory 512 of the portable radio 200. Accordingly, the memory 512 is connected to and accessible by the controller 510 through an electrical connection 538. The memory 512 may be a volatile memory and/or a non-volatile memory. For example, the memory 512 can include, but is not limited to, a Random Access Memory (RAM), a Dynamic Random Access Memory (DRAM), a Static Random Access Memory (SRAM), Read-Only Memory (ROM) and flash memory.

One or more sets of instructions 550 are stored in the memory 512. The instructions 550 can also reside, completely or at least partially, within the controller 510 during execution thereof by the portable radio 200. In this regard, the memory 512 and the controller 510 can constitute machine-readable media. The term "machine-readable media", as used here, refers to a single medium or multiple media that store the one or more sets of instructions 550. The term "machine-readable media", as used here, also refers to any medium that is capable of storing, encoding or carrying the set of instructions 550 for execution by the portable radio 200 and that cause the portable radio 200 to perform one or more of the methodologies of the present disclosure.

The controller 510 is also connected to a user interface 532. The user interface 532 is comprises input devices 516, output devices 524, and software routines (not shown in FIG. 5) configured to allow a user to interact with and control software applications 552 installed on the portable radio 200. Such input and output devices respectively include, but are not limited to, a display 528, a speaker 526, a keypad 520, a directional pad (not shown in FIG. 5), a directional knob (not shown in FIG. 5), and a microphone 522. The display 528 may be designed to accept touch screen inputs.

The input devices 516 also comprise control elements 518. The control elements 518 include, but are not limited to, a PTT switch or button, volume control buttons, and a rotary knob. PTT switches/buttons and volume control buttons are well known in the art. The PTT switch/button facilitates the immediate ability to talk to PTT service users of a particular talk group or social media profile. The volume control buttons facilitate the adjustment of the speaker volume for outputting audio received by a selected radio transceiver circuit 506 or 508. The rotary knob may provide a single knob control solution for selecting a radio transceiver circuit from the two radio transceiver circuits 506, 508, and changing the preset functions for the radio transceiver circuits.

Figure 6:
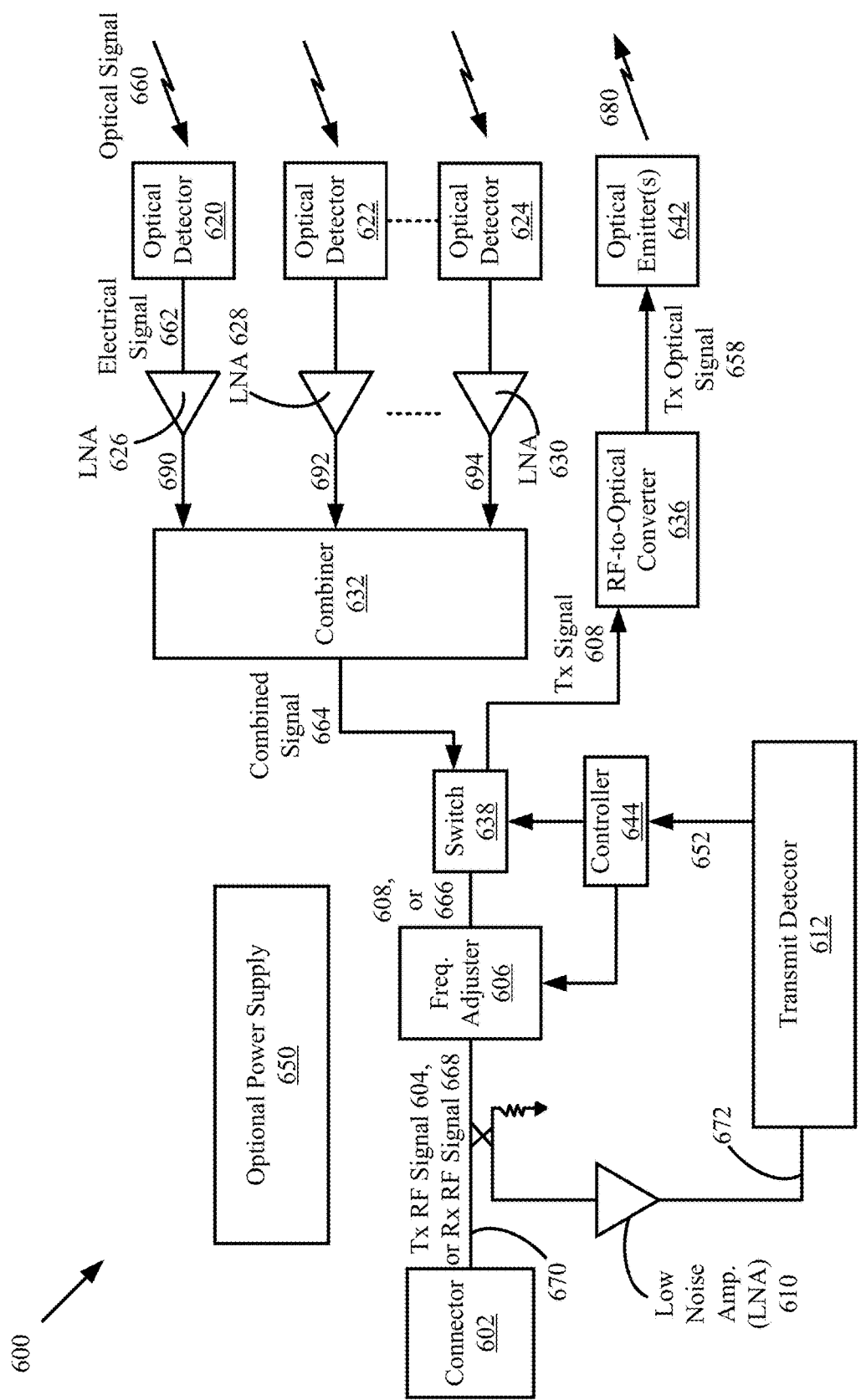
FIG. 6 provides a circuit diagram for an RF-to-FSO converter.

Referring now to FIG. 6, there is provided a circuit diagram for an RF-to-FSO converter 600. RF-to-FSO converter 212, 406 can be the same as or similar to RF-to-FSO converter 600. The RF-to-FSO converter 600 comprises a circuit that may be powered by an external device (e.g., power source 560 of FIG. 5) and/or an optional internal device 650. The circuit comprise a transmit branch and a receive branch. The transmit branch will be explained first, followed by a discussion of the receive branch.

The transmit branch comprises a low noise amplifier (LNA) 610, a transmit detector 612, a controller 644, a frequency adjuster 606, a switch 638, and RF-to-optical converter 636, and optical emitter(s) 642. Multiple optical emitters 642 can be provided to achieve omni-directional FSO communications. Any known or to be known optical emitter can be used here. In some scenarios, the optical emitters comprise short wave infrared (SWIR) light emitting diodes (LEDs).

As shown in FIG. 6, an electrical line 670 is connected between a connector 602 and the frequency adjuster 606. The connector 602 is configured to connect to an antenna port (e.g., antenna port 204 of FIGS. 2 and/or 502 of FIG. 5) of a communication device (e.g., communication device 102 of FIG. 1, 104 of FIG. 1, and/or 200 of FIG. 2). When the communication device is in a transmit mode, a transmit (Tx) RF signal 604 is provided from an RF transceiver (e.g., radio transceiver circuit 506 or 508 of FIG. 5) to the antenna port. The Tx RF signal 604 is then received at the RF-to-FSO converter 600. The Tx RF signal 604 travels from the connector 602 to the transmit detector 612 via the LNA 610. The transmit detector 612 issues a detection signal 652 when it detects a signal on line 672. The detection signal 652 is provided to the controller 644. In response to the detection signal 652, the controller 644 controls switch 638 to change position or state for establishing an electrical connection between the frequency adjuster 606 and the RF-to-optical converter 636.

The parameter(s) of the frequency adjuster 606 may be pre-calibrated in accordance with the particular of the optical emitter(s) 642 and/or optical detector(s) 620, 622, 624. For example, a frequency parameter is set to a value for causing the frequency of the Tx RF signal 604 to be adjusted by an amount optimized for operation of the optical emitter(s) 642 and/or optical detector(s) 620, 622, 624. The same or different frequency adjustment can be made to transmit signals and receive signals. This allows (i) the RF frequency used over FSO to be outside of the tunable frequency of the communication device and (ii) the RF-to-FSO converter 600 to be usable with RF waveforms that will only operate in limited RF frequencies that are not optimal for optical emitters and detectors.

Additionally or alternatively, the parameter(s) may be dynamically set and/or changed during operation of the RF-to-FSO converter 600. For example, the controller 644 may also select an amount by which the frequency of the Tx RF signal 604 is to be adjusted by the frequency adjuster 606 based on, for example, sensor data specifying atmospheric conditions (e.g., fog, snow, rain, etc.) at the current time. The frequency of the Tx RF signal 604 can be up converted (i.e., increased) or down converted (i.e., decreased) in accordance with any given application. The signal 608 output from the frequency adjuster 606 is passed to the RF-to-optical converter 636 via switch 638. At the RF-to-optical converter 636, signal 608 is used to modulate light source(s) of the optical emitter(s) 642. In effect, the optical emitter(s) 642 emit a modulated beam of light 680. The operations of the RF-to-optical converter 636 and optical emitter(s) 642 will be discussed in more detail below in relation to FIG. 7.

When the Tx RF signal 604 is no longer present on line 670, the transmit detector 612 stops issuing the detection signal 652. The controller 644 detects when the detection signal 652 is no longer being provided thereto. At this time, the controller 644 controls switch 638 to change position or state for (i) breaking the electrical connection between the frequency adjuster 606 and the RF-to-optical converter 636 and (ii) establishing an electrical connection between the combiner 632 and the frequency adjuster 606.

The receive branch comprises optical detectors 620, 622, 624, LNAs 626, 628, 630, combiner 632 and frequency adjuster 606. Each optical detector has a limited FOV. So, multiple optical detectors can be used to achieve a larger FOV (e.g., an omni-directional FOV). Generally, the outputs of the optical detectors are combined after the optical detectors recover the RF signal from the optical carrier. This may allow full omni-directional receive signals to be processed by a communication device as a single input without any switching.

When an optical signal 660 is received at an optical detector, a corresponding electrical signal 662 is generated and passed to an LNA 626, 628, 630. The LNA amplifies signal 662 and provides the amplified signal 664 to the combiner 632. The combiner 632 generates a combined signal 664 by combining the amplified signals 690, 692, 694 received from each optical detector sub-circuits 620/626, 622/628, 624/630. The combined signal 664 is passed to the frequency adjuster 606 via switch 638. At the frequency adjuster 606, the frequency of the combined signal 664 is adjusted to a pre-calibrated value or a dynamically determined value for optimized operation in view of the optical detectors being employed and/or atmospheric conditions. The resulting signal is referred to as a receive (Rx) RF signal 668. The Rx RF signal 668 is passed to an external device (e.g., communication device 102 of FIG. 1, 104 of FIG. 1, or 200 of FIG. 2) via connector 602.

In some scenarios, the optical detectors 620, 622, 624 comprise photodiodes. By using large area photodiodes and optimizing the system for low data rates (e.g., 10 Mbps vs. 10 Gbps), performance of the system can be increased. Also, the use of large area photodiodes removes alignment complexities and reduces power consumption of circuit 600.

Figure 7:
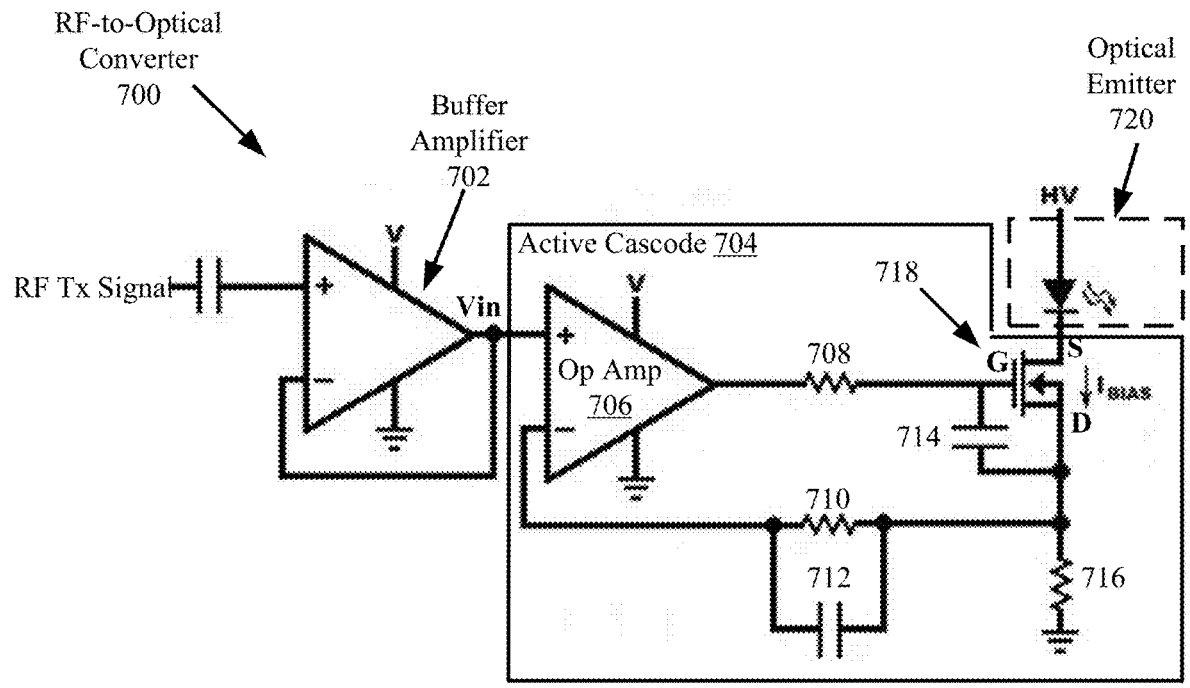
FIGS. 7-8 each provides a circuit diagram form an RF-to-optical converter.
Figure 8:
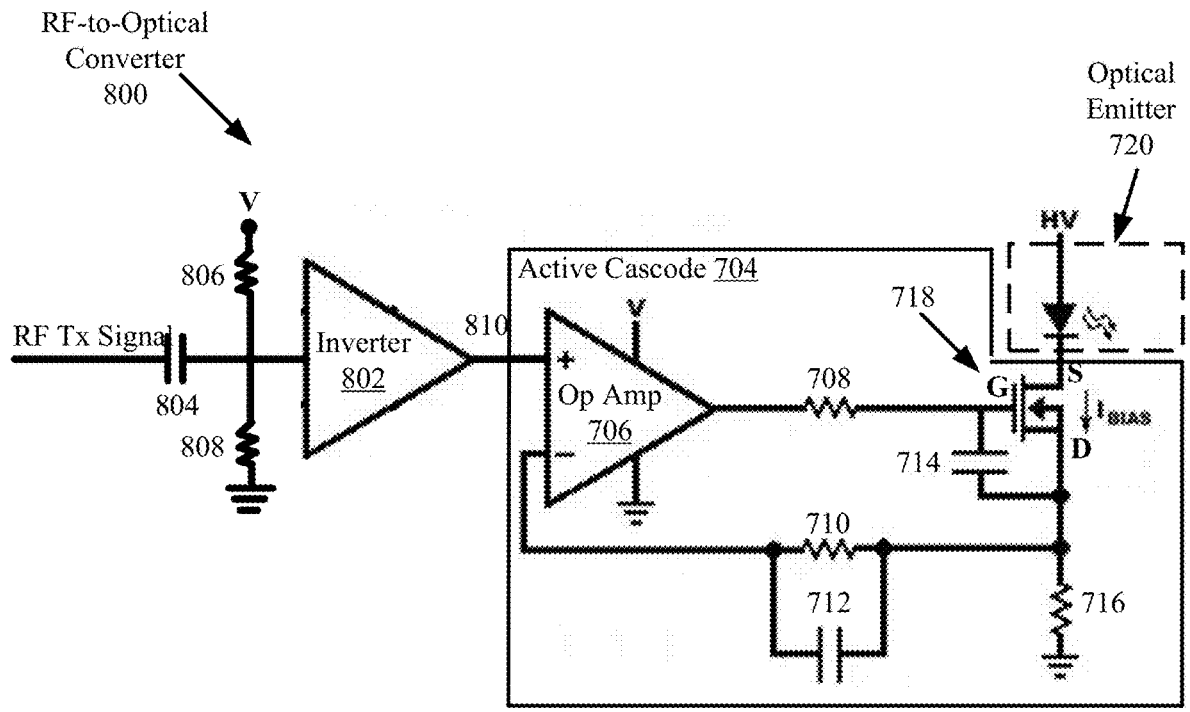

Referring to FIGS. 7-8, more detailed circuit diagrams for RF-to-optical converters 700, 800 are shown. RF-to-optical converter 636 of FIG. 6 can be the same as or similar to either of RF-to-optical converters 700, 800.

The RF-to-optical converters 700, 800 of FIGS. 7-8 both comprise an active cascode 704 coupled to an optical emitter 720. Optical emitter(s) 642 of FIG. 6 can be the same as or similar to optical emitter 720. The active cascode 704 generally acts as a driver for a light source (e.g., a light emitting diode (LED)). The active cascode 704 provides a means for converting voltage to a current at a 1-to-1 ratio. The input Vin, 810 of the active cascode is a digital signal or a square wave. The voltage of the input Vin, 810 is set to the voltage across resistor 716. The optical emitter 720 emits light when the input voltage Vin, 810 is high (e.g., 0.5 V) since current is flowing therethrough, and does not emit light when the input voltage Vin, 810 is low (e.g., 0.0 V) since current is no longer flowing therethrough. A constant current flows through the optical emitter 720 when it is emitting light. This constant current is facilitated by a control loop comprising a metal-oxide field effect transistor (MOSFET) 718. The gate G of the MOSFET 718 floats to maintain the constant current Ibias (e.g., 1 Amp) between its source S and drain D.

The difference between the RF-to-optical converters is that circuit 700 comprises a buffer amplifier 702 connected in series with the active cascode 704, while circuit 800 comprises an inverter 802 connected in series with the active cascode 704. In the inverter scenario, a DC biasing circuit 804, 806, 808 may be connected to the input of the inverter to ensure that the inverter 802 inverts the tx RF signal to a digital signal (i.e., with two states—high and low, or on and off). A resistor divider 806, 808 of the DC biasing circuit ensures that a particular voltage (e.g., 2.5 V when V=5 V) is provided the inverter input. The RF signal would be superimposed on the input voltage to the inverter due to the inclusion of capacitor 804.

In FIGS. 7-8, a single optical emitter 720 is shown. However, as noted above, the present solution may employ multiple optical emitters. In this case, two or more optical emitters could be driven by the same or different drive circuit 702/704 or 802-808/704. When driven by the same drive circuit, the optical emitters could be connected in series or parallel with each other.

Figure 9:
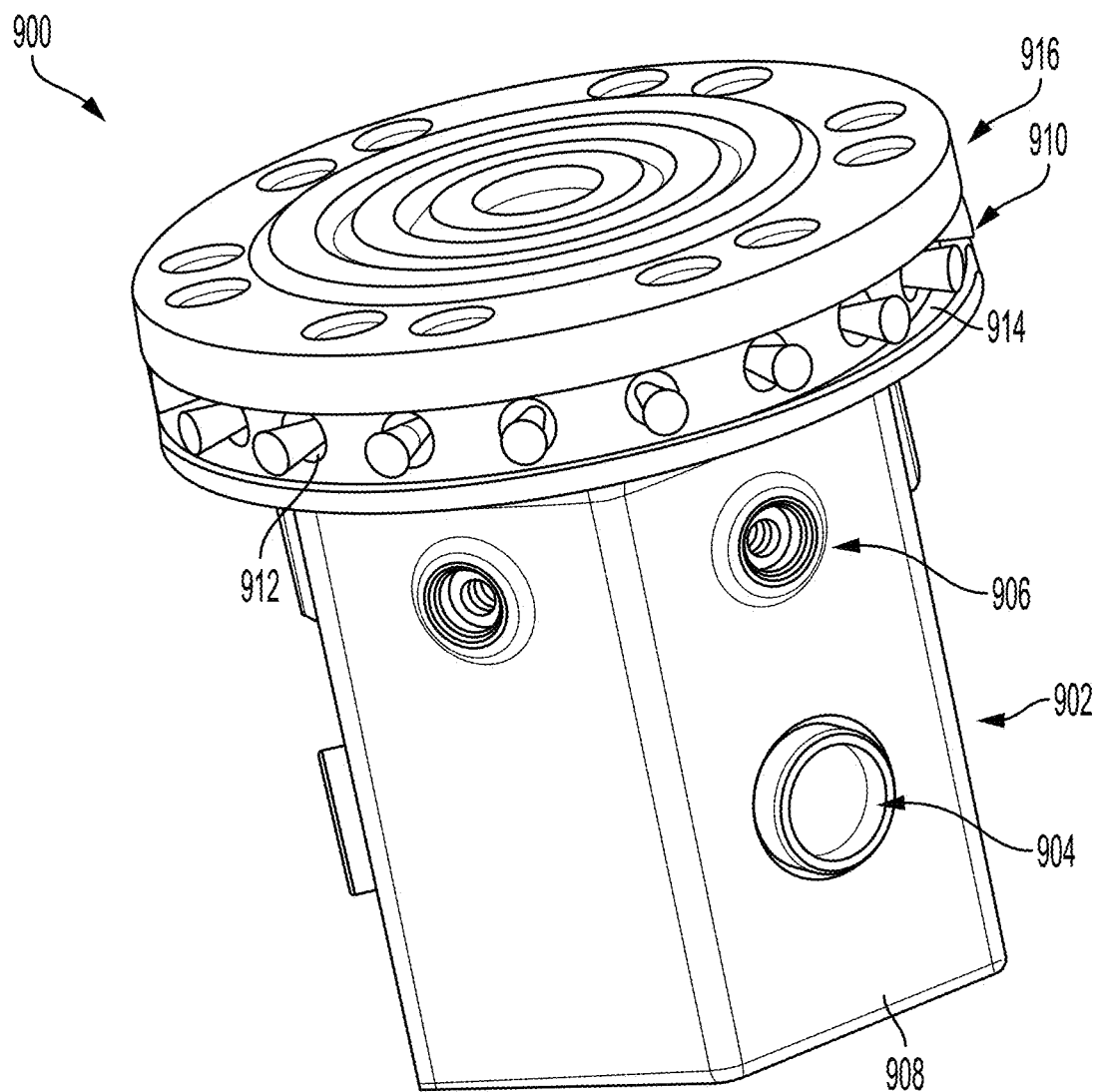
FIG. 9 provide a perspective view of an RF-to-FSO converter in an antenna port connector form.

Referring now to FIG. 9, there is provided a more detailed illustration of an RF-to-FSO converter 900 in an antenna connector form. The RF-to-FSO converter 212, 406, 600 may be the same as or similar to RF-to-FSO converter 900.

The RF-to-FSO converter 900 comprises a main body 902 which is shaped to have a plurality of flat faces 908. The main body 902 has a hexagonal shape in FIG. 9. The present solution is not limited in this regard. The main body can have other shapes selected in accordance with a given application. At least some of the flat faces 908 provide support structures for mounting optical detectors 904 thereon. Three optical detectors are provided in FIG. 9. However, any number of optical detectors can be provided in accordance with a given application.

An array 910 of optical emitters 912 is disposed on a top surface 914 of the main body 902. A heat sink 916 is disposed above the optical emitters 912. In FIG. 9, eighteen optical emitters are arranged circumferentially around the top surface 914 to provide an omni-directional solution. The present solution is not limited in this regard. Any number of optical emitters can be used in accordance with a given application. For example, there could be one or more planes (or layers) of optical emitters and/or a dome-like arrangement to increase the vertical FOV. For example, each optical emitter has 20° vertical FOV. Two panes or layers of optical emitters are provided in a stacked arrangement to increase the vertical FOV to 40°. The present solution is not limited in this regard.

Figure 10:
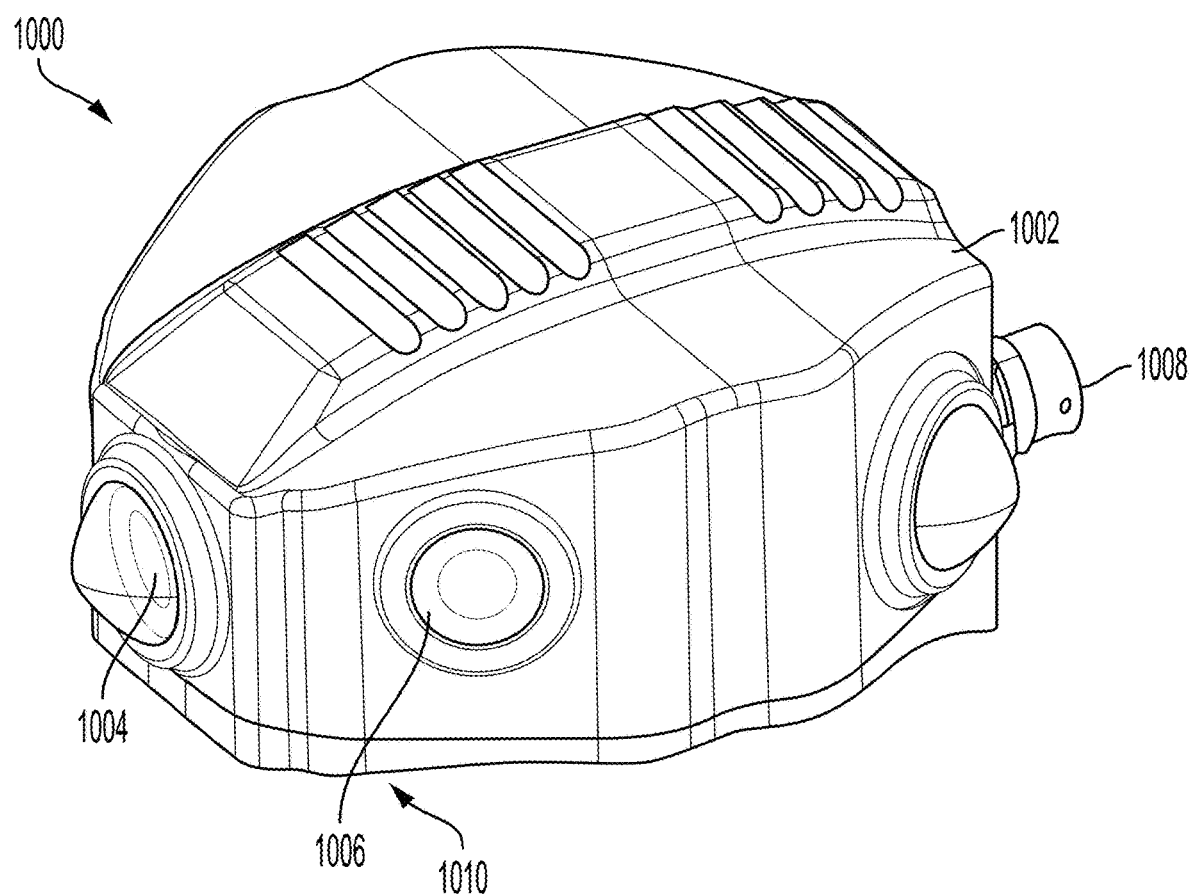
FIG. 10 provides a perspective view of an RF-to-FSO converter in a helmet mountable form.

Referring now to FIG. 10, there is provided a more detailed illustration of an RF-to-FSO converter 1000 in a helmet mountable form. The RF-to-FSO converter 212, 406, 600 may be the same as or similar to RF-to-FSO converter 1000.

The RF-to-FSO converter 1000 comprises a main body 1002 for supporting a plurality of optical detectors 1004, a plurality of optical emitters 1006, and at least one connector 1008 (e.g., an antenna port connector and/or a power connector). Three optical detectors (only two being visible) and three optical emitters (only one being visible) are provided with RF-to-FSO converter 1000. However, any number of optical detectors and optical emitters can be provided in accordance with a given application. For example, there could be one or more planes (or layers) of optical emitters and/or a dome-like arrangement to increase the vertical FOV. For example, each optical emitter has 20° vertical FOV. Two panes or layers of optical emitters are provided in a stacked arrangement to increase the vertical FOV to 40°. The present solution is not limited in this regard.

The RF-to-FSO converter 1000 can be coupled to a helmet or other object using any known or to be known coupler(s). For example, Velcro 1010 can be provided on a bottom surface of the main body 1002 for removably attaching the RF-to-FSO converter 1000 to a helmet or other object. The present solution is not limited in this regard. A cable (e.g., cable 404 of FIG. 4) can be used to couple the RF-to-FSO converter 1000 to a communication device (e.g., communication device 102 of FIG. 1, 104 of FIG. 1 or 200 of FIG. 2) prior or subsequent to the RF-to-FSO converter 1000 being coupled the helmet or other object.

The present solution is not limited to the particulars of the overall architecture shown in FIG. 10. Other illustrative architectures for an RF-to-FSO converter having a helmet mountable form are provided in FIGS. 11-17. The RF-to-FSO converter 212, 406, 600 may be the same as or similar to RF-to-FSO converter 1100.

Figure 11:
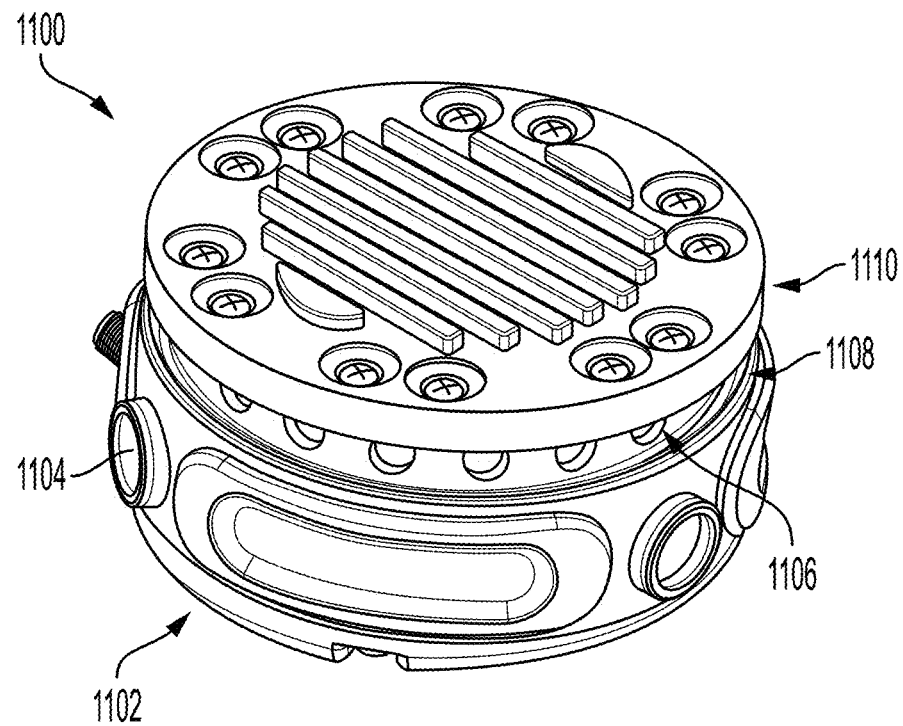
Figure 12:
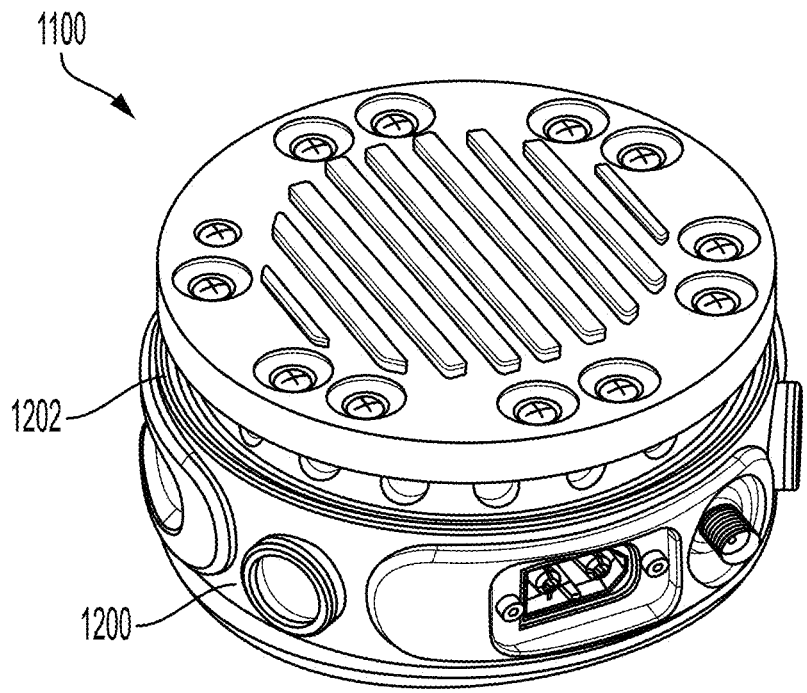
Figure 13:
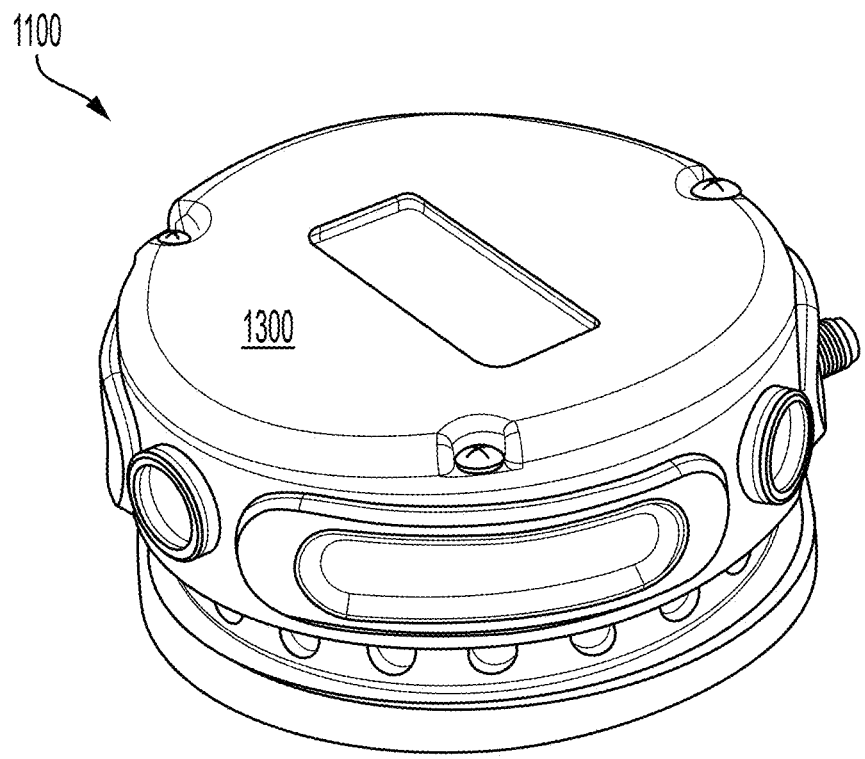
Figure 14:
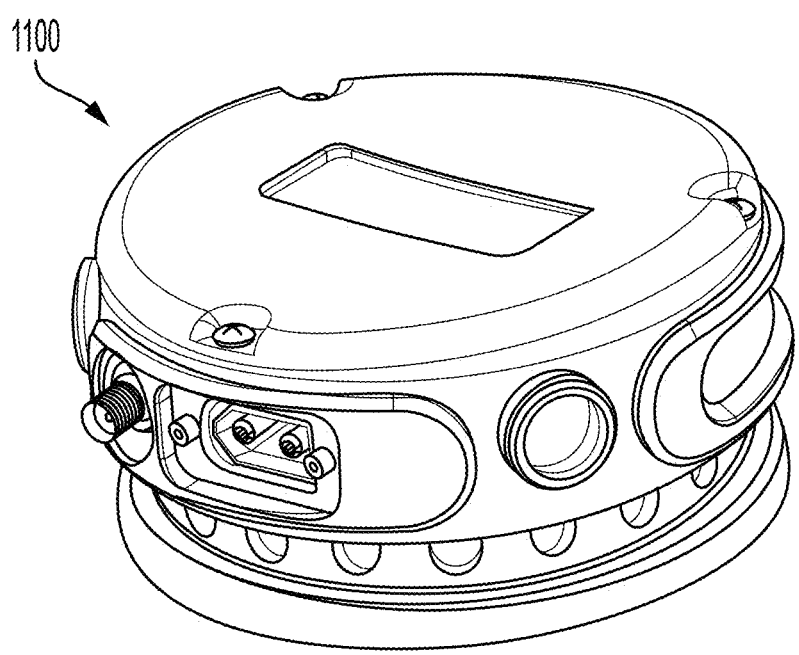

FIGS. 11-12 provide top perspective views of the RF-to-FSO converter 1100 in different orientations, and FIGS. 13-14 provide bottom perspective views of the RF-to-FSO converter 1100 in different orientations. FIG. 15 provides a side view of the RF-to-FSO converter 1100. FIG. 16 provides a bottom view of the RF-to-FSO converter 1100. FIG. 17 provides a top view of the RF-to-FSO converter 1100.

The RF-to-FSO converter 1100 comprises a main body 1102 sized and shaped to support optical emitters 1106 and optical detectors 1104 in a pre-defined arrangement. The main body 1102 has a circular cross-sectional profile. The present solution is not limited in this regard. The main body can have other shapes selected in accordance with a given application. The main body can be formed of any suitable material, such as plastic and/or rubber. The optical emitters 1106 are disposed on the sidewall 1200 of the main body 1102. The optical emitters 1106 are shown in FIGS. 11-17 as being equally spaced circumferentially around the sidewall 1200 to provide an omni-directional solution. The present solution is not limited in this regard. The spacing and number of optical emitters can be different in other scenarios based on the intended application of the RF-to-FSO converter.

An array 1109 of optical emitters 1106 is disposed on a top surface 1202 of the main body 1102. A heat sink 1110 is disposed above the optical emitters 1106. In FIGS. 11-17, eighteen optical emitters are arranged circumferentially around the top surface 1202 to provide an omni-directional solution. The present solution is not limited in this regard. Any number of optical emitters can be used in accordance with a given application. For example, there could be one or more planes (or layers) of optical emitters and/or a dome-like arrangement to increase the vertical FOV. For example, each optical emitter has 20° vertical FOV. Two panes or layers of optical emitters are provided in a stacked arrangement to increase the vertical FOV to 40°. The present solution is not limited in this regard.

The RF-to-FSO converter 1100 can be coupled to a helmet or other object using any known or to be known coupler(s). For example, Velcro 1110 can be provided on a bottom surface 1300 of the main body 1102 for removably attaching the RF-to-FSO converter 1100 to a helmet or other object. The present solution is not limited in this regard. A cable (e.g., cable 404 of FIG. 4) can be used to couple the RF-to-FSO converter 1100 to a communication device (e.g., communication device 102 of FIG. 1, 104 of FIG. 1 or 200 of FIG. 2) prior or subsequent to the RF-to-FSO converter 1100 being coupled the helmet or other object.

Figure 18:
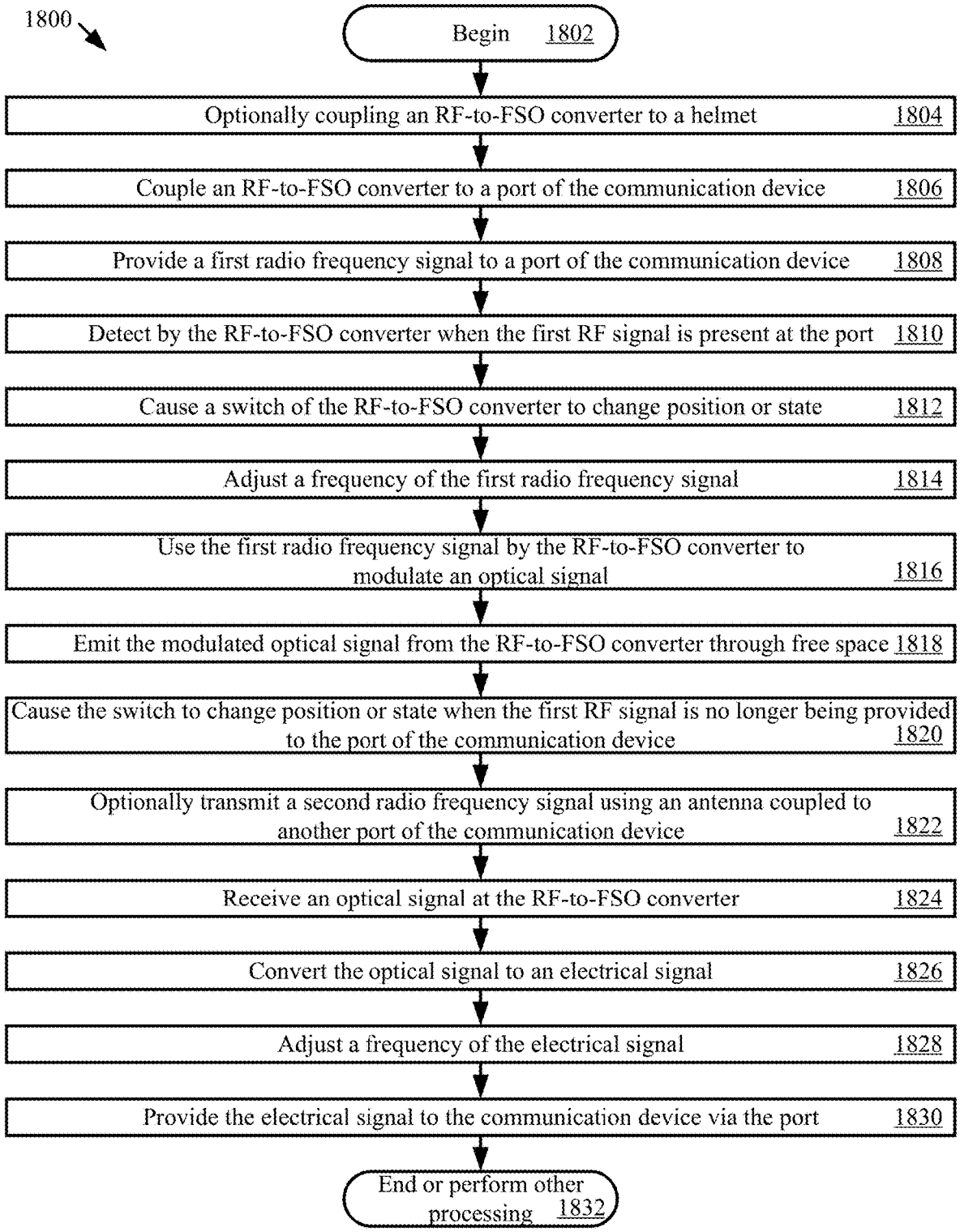
FIG. 18 provides a flow diagram of an illustration method for reducing detection and interference of signals communicated to and from a communication device.

Referring now to FIG. 18, there is provided a flow diagram of an illustrative method 1800 for reducing detection and interference of signals communicated to/from an RF communication device (e.g., communication device 102 of FIG. 1, 104 of FIG. 1 or 200 of FIG. 2). Method 1800 begins with 1802 and continues with 1804 where an RF-to-FSO converter (e.g., RF-to-FSO converter 212 of FIG. 2, 406 of FIG. 4, 600 of FIG. 6, 900 of FIG. 9, 1000 of FIG. 10 or 1100 of FIGS. 11-17) is optionally coupled to a helmet (e.g., helmet 408 of FIG. 4).

In 1806, the RF-to-FSO converter is coupled to a port (e.g., antenna port 204 of FIGS. 2 and/or 502 of FIG. 5) of the communication device. The RF-to-FSO converter may be directly coupled to the port of the communication device, or alternatively indirectly coupled to the port of the communication device via an extender (e.g., extender 300 of FIG. 3) or a cable (e.g., cable 404 of FIG. 4). A first RF signal (e.g., Tx RF signal 604 of FIG. 6) is provided to the port in 1808. The first RF signal is detected by the RF-to-FSO converter in 1810. Upon such detection, a switch (e.g., switch 638 of FIG. 6) is caused to change position or state as shown by 1812.

In 1814, a frequency of the first RF signal is adjusted. Thereafter, the first RF signal is used in 1816 to modulate an optical signal. The modulated optical signal is emitted from the RF-to-FSO converter through free space in 1818.

The switch is caused to change its position or state once again in 1820 when the first RF signal is no longer being provided to the port of the communication device. The communication device may optionally transmit a second RF signal in 1822 using an antenna coupled to another port of the communication device.

In 1824-1830, the RF-to-FSO converter performs receive operations. The receive operations involve: receiving an optical signal; converting the optical signal to an electrical signal; adjusting a frequency of the electrical signal; and providing the electrical signal (with the adjusted frequency) to the communication device via the port. Subsequently, 1832 is performed where method 1800 ends or other operations are performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. An electronic device, comprising:
a connector; and
a circuit coupled to the connector and configured to:
   receive a first radio frequency signal when the connector is coupled to a port of an external communication device;
   use the first radio frequency signal to modulate an optical signal; and
   emit the modulated optical signal through free space;
wherein the circuit comprises a plurality of optical emitters and a plurality of optical detectors arranged to provide a 360° field of view.

2. The electronic device according to claim 1, wherein the port comprises an antenna port.

3. The electronic device according to claim 1, wherein the connector is directly couplable to the port or indirectly couplable to the port of the communication device via an extender or a cable.

4. The electronic device according to claim 1, wherein the circuit is further configured to adjust a frequency of the first radio frequency signal prior to when the first radio frequency signal is used to modulate the optical signal.

5. The electronic device according to claim 1, wherein the circuit comprise a switch and is further configured to:
   detect when the first RF signal is present at the port of the communication device; and
   cause the switch to change position or state when a detection of the first RF signal is made.

6. The electronic device according to claim 1, wherein the circuit comprise a switch and is further configured to cause the switch to change position or state when the first RF signal is no longer being provided to the port.

7. The electronic device according to claim 1, wherein the circuit is further configured to:
   receive an optical signal at the RF-to-FSO converter;
   convert the optical signal to an electrical signal;
   adjust a frequency of the electrical signal; and
   provide the electrical signal, with the adjusted frequency, from the RF-to-FSO converter to the communication device via the port.

8. A signal converter, comprising:
a main body;
a connector coupled to the main body; and
a circuit disposed in the main body, coupled to the connector, and configured to:
   receive a first radio frequency signal when the connector is coupled to a port of an external communication device;
   use the first radio frequency signal to modulate an optical signal; and
   cause the modulated optical signal to be emitted through free space; and
a coupler disposed on a bottom surface of the main body and configured to removably couple the signal converter to a helmet;
wherein the circuit comprises a plurality of optical emitters circumferentially arranged on a top surface of the main body and a plurality of optical detectors supported by sidewalls of the main body in a spaced apart arrangement.

\* \* \* \* \*